(12) United States Patent
Pawliczek et al.

(10) Patent No.: US 10,967,785 B2
(45) Date of Patent: Apr. 6, 2021

(54) AIRCRAFT PASSENGER LIGHT WITH READING AND HALO LIGHTING

(71) Applicant: Goodrich Lighting Systems GmbH, Lippstadt (DE)

(72) Inventors: Carsten Pawliczek, Lippstadt (DE); Christian Schoen, Mainz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/711,881

(22) Filed: Dec. 12, 2019

(65) Prior Publication Data
US 2021/0009033 A1 Jan. 14, 2021

(30) Foreign Application Priority Data

Jul. 12, 2019 (EP) ...................................... 19186071

(51) Int. Cl.
| | | |
|---|---|---|
| *B60Q 3/44* | (2017.01) | |
| *B64D 11/00* | (2006.01) | |
| *B60Q 3/47* | (2017.01) | |
| *F21V 7/06* | (2006.01) | |
| *F21W 107/30* | (2018.01) | |
| *F21Y 105/18* | (2016.01) | |
| *F21Y 115/10* | (2016.01) | |
| *F21Y 113/13* | (2016.01) | |
| *F21W 106/00* | (2018.01) | |

(52) U.S. Cl.
CPC ................. *B60Q 3/44* (2017.02); *B60Q 3/47* (2017.02); *B64D 11/00* (2013.01); *F21V 7/06* (2013.01); *B64D 2011/0053* (2013.01); *B64D 2203/00* (2013.01); *F21W 2106/00* (2018.01); *F21W 2107/30* (2018.01); *F21Y 2105/18* (2016.08); *F21Y 2113/13* (2016.08); *F21Y 2115/10* (2016.08)

(58) Field of Classification Search
CPC . F21W 2107/30; F21W 2106/00; B60Q 3/44; B60Q 3/47; F21Y 2115/10; B64D 2011/0053; B64D 2011/0038; F21V 7/06
See application file for complete search history.

(56) References Cited

U.S. PATENT DOCUMENTS

| | | | |
|---|---|---|---|
| 2011/0164429 A1* | 7/2011 | Heym | ....................... F21K 9/69 362/471 |
| 2015/0036368 A1 | 2/2015 | Rittner | |

(Continued)

FOREIGN PATENT DOCUMENTS

| | | |
|---|---|---|
| DE | 102010014839 A1 | 8/2011 |
| DE | 102017215892 A1 | 3/2019 |

(Continued)

OTHER PUBLICATIONS

European Search Report for Application No. 19186071.7-1010, dated Feb. 3, 2020, 7 pages.

*Primary Examiner* — Robert J May
(74) *Attorney, Agent, or Firm* — Cantor Colburn LLP (57) ABSTRACT

An aircraft passenger light includes a reading light unit having a reading light unit and a halo light unit. The reading light unit includes at least one reading light source and is configured for emitting a targeted reading light output. The halo light unit includes at least one halo light source and is configured for emitting a ring shaped halo light output, at least partly surrounding the targeted reading light output.

20 Claims, 5 Drawing Sheets

(56) References Cited

U.S. PATENT DOCUMENTS

| | | |
|---|---|---|
| 2015/0251594 A1 | 9/2015 | Timm |
| 2017/0029113 A1 | 2/2017 | Freund |
| 2017/0073075 A1 | 3/2017 | Gagnon |
| 2017/0203856 A1 | 7/2017 | Dunn et al. |

FOREIGN PATENT DOCUMENTS

| | | |
|---|---|---|
| EP | 1043542 B2 | 10/2000 |
| FR | 3062893 A1 | 8/2018 |
| JP | 2007134067 A | 5/2007 |

\* cited by examiner

AIRCRAFT PASSENGER LIGHT WITH READING AND HALO LIGHTING

FOREIGN PRIORITY

This application claims priority to European Patent Application No. 19186071.7 filed Jul. 12, 2019, the entire contents of which is incorporated herein by reference.

TECHNICAL FIELD

The present invention is in the field of lighting devices. In particular, the present invention is in the field of lighting devices for aircraft and aircraft equipped with such lighting devices. Further in particular, the present invention is in the field of interior aircraft lighting systems.

BACKGROUND

Modern aircraft comprise a variety of interior aircraft lights, including cabin illumination lights, aircraft passenger lights, exit sign lights, etc. An individually switchable aircraft passenger light ("reading light") is usually provided over and associated with each passenger seat.

It would be beneficial to increase the application range of interior aircraft lighting systems.

SUMMARY

Exemplary embodiments of the invention include an aircraft passenger light, comprising a reading light unit and a halo light unit. The reading light unit comprises at least one reading light source and is configured for emitting a targeted reading light output. The halo light unit comprises at least one halo light source and is configured for emitting a ring-shaped halo light output, at least partly surrounding the targeted reading light output.

The halo light unit adds additional functionality to the aircraft passenger light as it allows using the aircraft passenger light for additional purposes, in particular for indicating and signaling purposes, without occupying substantial additional space within the passenger cabin of the aircraft, in particular without dedicating an additional location within the passenger cabin of the aircraft to the additional functionality.

The halo light unit may for example be used for indicating acoustic announcements and/or for providing information related to an associated passenger seat.

According to a further embodiment, the halo light unit is configured for emitting a ring-shaped halo light output, completely surrounding the targeted reading light output. However, it is also possible that the halo light output only partly surrounds the targeted reading light output or surrounds the targeted reading light output in an interrupted manner, such as interrupted by mounting bars or strips, connecting the reading light unit, in particular a reflector thereof, to a housing of the aircraft passenger light on a light emission side of the aircraft passenger light. All of completely ring-shaped, partly ring-shaped or interrupted ring-shaped halo light outputs are encompassed by the terminology of the ring-shaped halo light output at least partly surrounding the targeted reading light output.

According to a further embodiment, the reading light unit and the halo light unit have a common light emission plane, through which the targeted reading light output and the ring-shaped halo light output are emitted when the reading light unit and/or the halo light unit are operated. The reading light unit and the halo light unit may emit their respective light outputs in similar directions, in particular towards the associated passenger seat so that both light outputs are easily and reliably visible by a passenger sitting on said passenger seat. The reading light output may be more collimated than then halo light output. In other words, the opening angle of the reading light output may be more narrow than the opening angle of the halo light output. The halo light output in particular is not intended for illuminating of a target surface. While the reading light output may be exclusively targeted to the passenger's personal space, the halo light output may be visible from outside the passenger's personal space as well. For example, the halo light output may be visible for a passenger walking by the passenger seat associated with the aircraft passenger light in question.

According to a further embodiment, the reading light unit and/or the halo light unit comprise a transparent cover for protecting the at least one reading light source and the at least one halo light source, respectively. The cover further protects the passenger from burning himself/herself by touching the potentially hot light sources and/or sensitive optical surfaces. Individual covers may be provided for the reading light unit and the halo light unit, respectively. Alternatively, a single cover, covering both the reading light unit and the halo light unit, may be provided.

According to a further embodiment, the reading light unit comprises a reflector configured for directing the light output from the at least one reading light source towards the passenger seat. In this way, an efficient illumination of the area above the passenger seat may be achieved.

The reflector may be rotationally symmetric with respect to a main light-emission axis of the reading light unit. The reflector may in particular a parabolic reflector. A parabolic reflector is easy to produce at low costs and allows for a very efficient illumination of the area above the passenger seat. The reflector may also be spherical or may be comprised of multiple spherical sections or may have any other suitable shape for concentrating the light from the at least one reading light source.

According to a further embodiment, the reflector surrounds the at least one reading light source. Such a configuration results in an efficient reflection of the light, emitted by the at least one reading light source into various initial directions.

According to a further embodiment, the at least one halo light source is arranged outside the reflector. Such a configuration allows for shaping the halo light output from the light emitted from the at least one halo light source independently of shaping the halo light output from the light emitted by the at least one reading light source. This adds additional flexibility to forming the total light output of the aircraft passenger light.

According to a further embodiment, at least one of an inner surface and an outer surface of the reflector are reflective, in order to avoid absorbing considerable amounts of the light emitted by the at least one reading light source and the at least one halo light source, respectively.

The reflector may be made of a reflective material, such as metal. The reflector also may be coated with a reflective coating, in particular with a metallic coating.

According to a further embodiment, the aircraft passenger light comprises at least one outer wall arranged outside the reflector. In combination with the reflector, the outer wall in particular may form a halo light chamber between the outer surface of the reflector and the outer wall. The at least one halo light source may be arranged within said halo light chamber. Such a configuration allows for forming a ring-shaped halo light output around the reading light output. It further allows for shaping the halo light output by shaping the halo light chamber accordingly.

According to a further embodiment, an inner side of the outer wall, facing the halo light chamber, is reflective or diffusely reflective, in order to avoid that a considerable amount of the light emitted by the at least one halo light source is absorbed by the outer wall. The inner side of the outer wall in particular may have a white color, or it may be coated with a reflective or diffusely reflective, in particular white, coating. The combination of a reflective outer surface of the reflector and a diffusely reflective, in particular white, inner side of the outer wall may provide for a particularly uniformly distributed and fairly wide angled halo light output, such that a pleasant appearance and an extended visibility of the halo light unit may be achieved.

According to a further embodiment, the at least one reading light source and the at least one halo light source are arranged on a common circuit board, in particular on a common printed circuit board. Such a configuration results in a compact structure of the aircraft passenger light, which may be assembled easily at low costs as the number of parts to be assembled is small.

According to a further embodiment, the at least one reading light source and/or the at least one halo light source is or comprises an LED. LEDs provide efficient and reliable light sources at low costs.

According to a further embodiment, the at least one reading light source is configured for emitting white light, in particular white light having a correlated color temperature of more than 2500 K. White light is preferably used for reading lights.

According to a further embodiment, the at least one halo light source is configured for emitting white light, in particular whitish light having a correlated color temperature of more than 2500 K, or light having a different color, in particular, red, green, blue, yellow, purple or orange light.

According to a further embodiment, the halo light unit comprises a plurality of independently controllable halo light sources of different colors, particularly at least three independently controllable halo light sources of different colors, such as independently controllable red, green, and blue halo light sources. Such a configuration allows the halo light unit to emit light of almost arbitrary color by selectively activating one or more of the halo light sources, providing a large flexibility of the light emitted by the aircraft passenger light.

Exemplary embodiments of the invention also include an aircraft comprising at least one aircraft passenger light according to any of the exemplary embodiments of the invention, as described above. Exemplary embodiments of the invention in particular include an aircraft comprising a passenger cabin and at least one aircraft passenger light according to an exemplary embodiment of the invention arranged within the passenger cabin. A plurality of passenger seats and aircraft passenger lights may be arranged within the passenger cabin. Each aircraft passenger light may be associated with one of the passenger seats, respectively; i.e. the reading light unit of each aircraft passenger light may be configured for illuminating a space above the associated passenger seat, in order to provide a personal reading light for a passenger sitting on the associated passenger seat. The additional features, modifications, and effects, described above with respect to the aircraft passenger light, apply to the aircraft in an analogous manner.

Exemplary embodiments of the invention further include a method of operating an aircraft passenger light according to any of the exemplary embodiments of the invention, as described above, wherein the method comprises operating the at least one halo light source independently from the at least one reading light source. This allows using the halo light unit for indication purposes independently of the reading light source.

Exemplary embodiments of the method in particular include selecting a color of the halo light output depending on a category and/or an occupancy status of the associated passenger seat and operating the at least one halo light source to emit the selected color. This allows passengers to recognize the category and/or the occupancy status of the passenger seats more easily, resulting in a safer and faster boarding of the passengers.

For example, a yellow ("gold") halo light output may indicate first class seats, a red halo light output may indicate business class seats, and a green halo light output may indicate economy class seats. The colors of the halo light output may correspond with color codes printed on the tickets of the respective class.

Alternatively, a green halo light output may indicate empty seats and a red halo light output may indicate occupied/reserved seats.

According to a further embodiment, the at least one halo light source is operated in a flashing mode and/or the at least one halo light source is activated with or in advance of an acoustic announcement in the passenger cabin, in order to increase the awareness of the passengers to said announcement.

BRIEF DESCRIPTION OF THE FIGURES

Further exemplary embodiments of the invention will be described with respect to the accompanying drawings, wherein.

DETAILED DESCRIPTION

Figure 1:
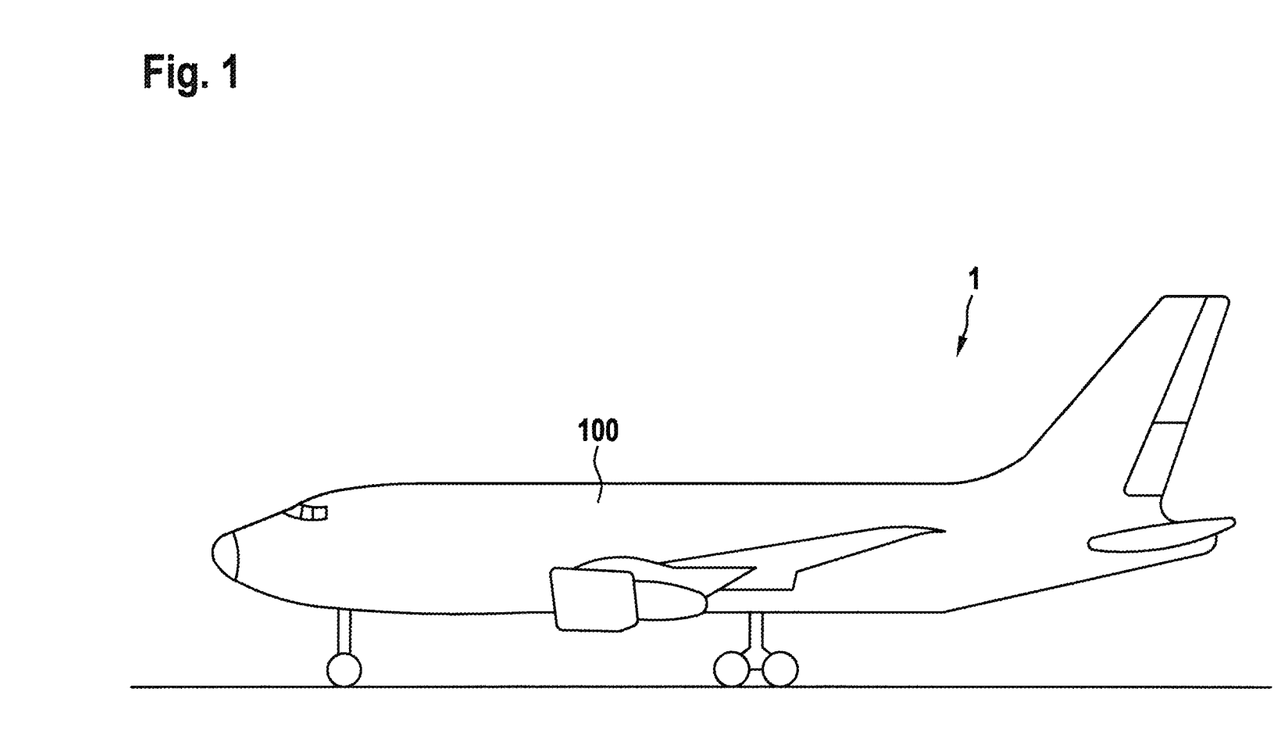
FIG. 1 schematically shows an aircraft with a passenger cabin, the aircraft being in accordance with an exemplary embodiment of the invention.

FIG. 1 shows a schematic side view of an aircraft 1 with a passenger cabin 100. The aircraft 1 comprises a plurality of aircraft passenger lights in accordance with exemplary embodiments of the invention. The aircraft passenger lights are located in the interior of the passenger cabin and are thus not visible in the side view of FIG. 1.

Figure 2:
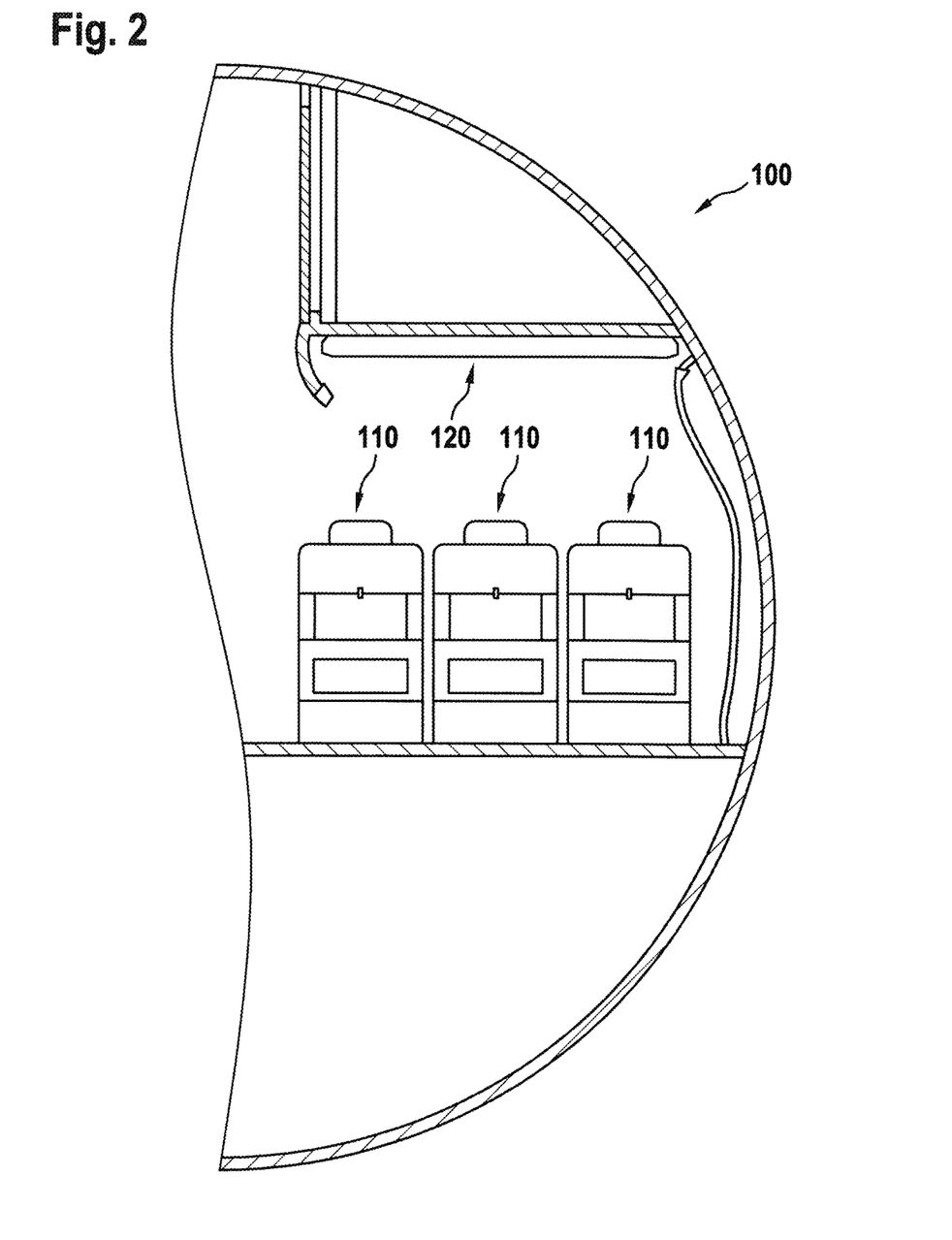
FIG. 2 shows a schematic cross-sectional view through the passenger cabin of the aircraft of FIG. 1.

FIG. 2 shows a schematic cross-sectional view through the passenger cabin 100 of the aircraft 1. FIG. 2 in particular shows a row of three passenger seats 110 and an overhead passenger service unit 120 installed above the passenger seats 110. The overhead passenger service unit 120 comprises the aircraft passenger lights in accordance with exemplary embodiments of the invention, as will be laid out below.

Figure 3:
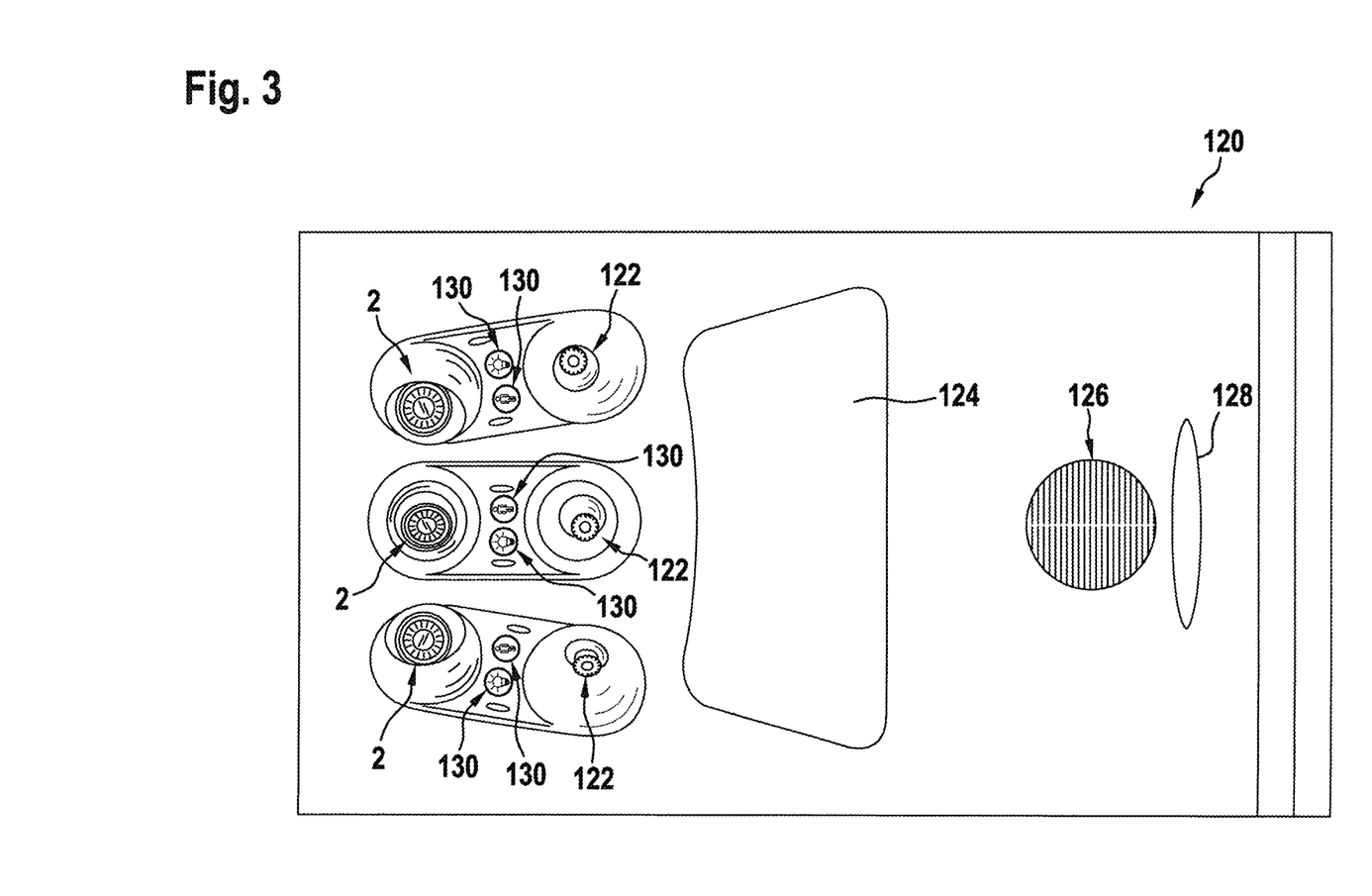
FIG. 3 shows an overhead passenger service unit, comprising aircraft passenger lights in accordance with exemplary embodiments of the invention, in a schematic view.

FIG. 3 shows a more detailed schematic view of an overhead passenger service unit 120 from a position below the overhead passenger service unit 120.

On the side depicted to the left in FIG. 3, the overhead passenger service unit 120 comprises a row of three adjustable aircraft passenger lights (personal reading lights) 2, arranged next to each other in a lateral direction. Each of the aircraft passenger lights 2 may be embodied in accordance with any of the embodiments of aircraft passenger lights 2, described herein.

Six electrical switches 130 are provided to the right side of the aircraft passenger lights 2, a pair of two switches 130 next to each of the aircraft passenger lights 2, respectively. One of the switches 130 of each pair may be configured for switching the adjacent aircraft passenger light 2, while the second switch of each pair may be configured for triggering a signal for calling cabin service personnel.

A row of three adjacent gaspers 122, arranged in the lateral direction, is provided next to the switches 130. The overhead passenger service unit 120 further comprises a loudspeaker 126, a display panel 128, and a covered cavity 124 for housing at least one oxygen mask (not shown).

Figure 4:
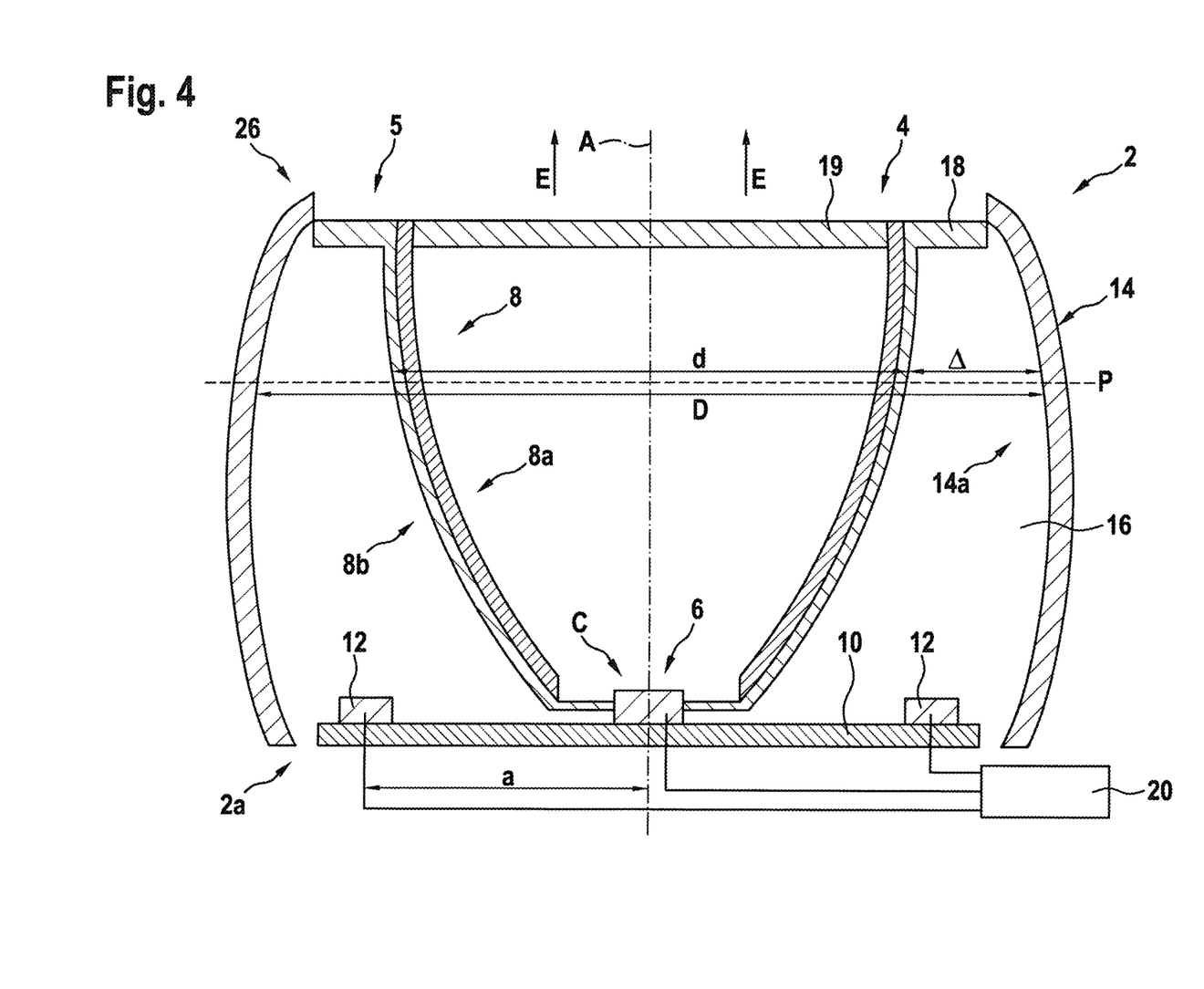
FIG. 4 shows a schematic cross-sectional view of an aircraft passenger light according to an exemplary embodiment of the invention.
Figure 5:
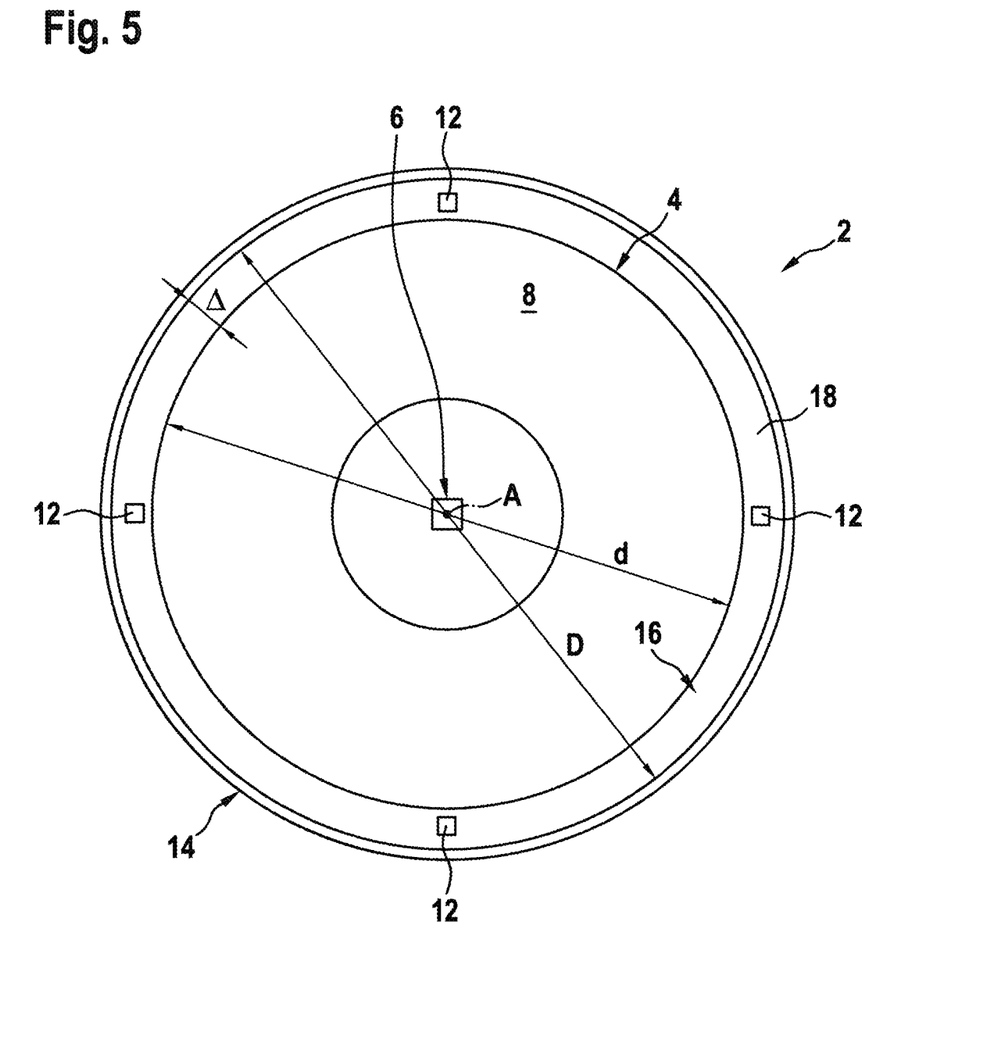
FIG. 5 shows a schematic plan view of the aircraft passenger light shown in FIG. 4.

FIG. 4 depicts a schematic cross-sectional view of an aircraft passenger light 2 according to an exemplary embodiment of the invention. FIG. 5 depicts a schematic plan view of the aircraft passenger light 2 shown in FIG. 4.

The aircraft passenger light 2 comprises a basically circular outer wall 14 forming a nearly-cylindrical barrel, constituting part of a housing of the aircraft passenger light 2.

A reflector 8, which in particular may be a parabolic reflector, is arranged within the housing, formed by the circular outer wall 14. The reflector 8 may have rotational symmetry and in particular is arranged coaxially with the circular outer wall 14 on a common axis A.

In any virtual plane P oriented orthogonally to the axis A, the diameter d of the reflector 8 is smaller than the diameter D of the outer wall 14. As a result, the outer wall 14 is spaced apart from the reflector 8 in the radial direction, forming an interior space ("halo light chamber") 16 between an outer surface 8b of the reflector 8 and the outer wall 14.

The diameters d, D of the reflector 8 and of the outer wall 14 may vary in the direction along the axis A, but the diameter d of the reflector 8 remains smaller than the diameter D of the outer wall 14. The difference $\Delta=D-d$ between the diameter D of the outer wall 14 and the diameter d of the reflector 8 for example may be smaller at an inner side 2a of the aircraft passenger light 2 (shown at the bottom of FIG. 4) than at an opposing outer light emission side 2b (shown at the top of FIG. 4).

The variation of the diameters d, D of the reflector 8 and of the outer wall 14 in particular may result in a "banana like" cross-section of the halo light chamber 16, as it is schematically depicted in FIG. 4.

At least one reading light source 6 is provided within the reflector 8, in particular in an optical center of the reflector 8. The at least one reading light source 6 may be or may include at least one LED.

The at least one reading light source 6 and the reflector 8 in combination constitute a reading light unit 4, configured for emitting a reading light output, which is basically centered around the axis A, when the at least one reading light source 6 is operated.

The least one reading light source 6 may be configured for emitting white light, in particular white light having a correlated color temperature of at least 2500 K.

The at least one reading light source 6 may be dimmable and/or it may comprise a plurality of reading light sources 6 which are individually switchable for varying the intensity of the light emitted by the reading light unit 4.

An inner side 8a of the reflector 8, facing the axis A, is reflective. The reflector 8 may be made of a reflective material, e.g. a metal.

The inner side 8a of the reflector 8 may also be covered by a reflective coating, such as a metallic coating, for efficiently reflecting the light emitted by the at least one reading light source 6 in light emission directions E extending basically parallel to the axis A.

At least one halo light source 12 is arranged in the halo light chamber 16, formed between the outer surface 8b of the reflector 8 and the outer wall 14.

The at least one halo light source 12 and the at least one reading light source 6 in particular may be mounted to a common circuit board 10, in particular a printed circuit board, extending basically orthogonally to the axis A. In such a configuration, the at least one reading light source 6 is arranged at or close to the center C of the reflector 8/the axis A, and the at least one halo light source 12 is arranged at some radial distance a from the axis A within the halo light chamber 16, formed between the reflector 8 and the outer wall 14.

The at least one halo light source 12 is configured for emitting the light into the halo light chamber 16 surrounding the reflector 8.

The outer side 8b of the reflector 8 and/or the inner side 14a of the outer wall 14, facing the halo light chamber 16, may be reflective or diffusely reflective for reducing the amount of light absorbed by the reflector 8 and the outer wall 14, respectively.

The reflector 8 and/or the outer wall 14 may be made of a reflective material, in particular a metallic material, or the outer side 8b of the reflector 8 and the inner side 14a of the outer wall 14 may be covered with a reflective coating, such as a metallic coating, respectively.

Alternatively, the outer side 8b of the reflector 8 and/or the inner side 14a of the outer wall 14 may be white, or coated with a diffusely reflective coating, in particular a white coating.

For protecting the at least one halo light source 12, an at least partially transparent cover 18 is provided at an (outer) end of the halo light chamber 16 at the outer light emission side 2b of the aircraft passenger light 2. The at least partially transparent cover 18 is arranged opposite to the circuit board 10 with the at least one halo light source 12. For protecting the at least one reading light source 6, another at least partially transparent cover 19 may extend over the outer side of the reflector 8. Alternatively, a single at least partially transparent cover (not shown) may cover both, the open outer side of the reflector 8 and the outer end of the halo light chamber 16. The cover(s) 18, 19 may be formed integrally with or separately from the reflector 8. As another alternative, an at least partially transparent cover (not shown) may be part of or attached to the overhead passenger service unit 120 so that it is arranged in front of the aircraft passenger light 2. In any configuration, the at least partially transparent cover 19 may include a spreading disc causing a diffuse light output to be emitted from the halo light unit 5.

When viewed in a plan view, a plurality of halo light sources 12 may be arranged at constant angular intervals, for example at angular intervals of 180°, 90° (as depicted in FIG. 5), 60°, 45°, 30° or 15°, along the circumference of the halo light chamber 16. Alternatively, a plurality of halo light sources 12 may be arranged at nonconstant angular intervals along the circumference of the halo light chamber 16.

The at least one halo light source 12 may be an LED or comprise a plurality of LEDs.

The at least one halo light source 12 may be configured for emitting white light, in particular light having a correlated color temperature of at least 2500 K Alternatively or additionally, the at least one halo light source 12 may be configured for emitting light having a different color, in particular, red, green, blue, yellow, purple or orange light.

The halo light unit 5 may comprise a plurality of independently controllable halo light sources 12 which are configured for emitting light of different colors. The halo light unit 5 in particular may comprise at least three independently controllable halo light sources 12 of different colors, including at least one independently controllable red, green, and blue halo light source, respectively. Such a configuration allows the halo light unit to emit light having almost arbitrary colors by mixing the light emitted by the at least three halo light sources 12. Alternative combinations of light sources of different colors are also possible. In particular, it is possible that the halo light unit 5 comprises a white light source, a red light source, a green light source, and a blue light source.

The aircraft passenger light 2 may further comprise a controller 20 configured for controlling the at least one reading light source 6 and/or the at least one halo light source 12.

In case a plurality of reading light sources 6 are provided, the controller 20 may be configured for varying the intensity of light emitted by the reading light unit 4 by changing the number of activated reading light sources 6. Alternatively or additionally, the controller 20 may be configured for varying the intensity of light emitted by the reading light unit 4 by dimming the activated reading light source(s) 6.

In case a plurality of halo light sources 12 are provided, the controller 20 may be configured for varying the intensity of light emitted by the halo light unit 5 by changing the number of activated halo light sources 12. Alternatively or additionally, the controller 20 may be configured for varying the intensity of light emitted by the halo light unit 5 by dimming the activated halo light source(s) 12.

In case a plurality of halo light sources 12, configured for emitting light of different colors, is provided, the controller 20 may be configured for varying the color of the light emitted by the halo light unit 5 by selectively activating, deactivating and/or dimming the halo light sources 12 individually.

Although a single controller 20 is depicted in FIG. 4, separate controllers for controlling the reading light sources 6 and the halo light sources 12 may be provided.

The at least one reading light source 6 may be operated independently from the at least one halo light source 12. Operating the at least one reading light source 6 and operating the at least one halo light source 12 may include activating only a portion (subgroup) of a plurality of reading light sources 6 or halo light sources 12, respectively. Operating the at least one halo light source 12 may further include changing the color of the light emitted by the halo light unit 5 by selectively activating and/or deactivating and/or dimming different halo light sources 12 individually. The at least one halo light source 12 also may be operated in a flashing mode, in which the at least one halo light source 12 is repeatedly, in particular periodically, switched on and off.

For increasing awareness of the passengers, the at least one halo light source 12 may be activated simultaneously with or in advance of an acoustic announcement via the loudspeaker 126. Additionally, the at least one reading light source 6 may be dimmed simultaneously with or in advance of an acoustic announcement for increasing awareness of the passengers even further.

The color of the light output emitted by the halo light unit 5 may be selected depending on a category and/or an occupancy status of a passenger seat 110 associated with the respective aircraft passenger light 2.

In particular, different colors of the halo light output may be used for distinguishing between free and occupied/reserved passenger seats 110.

Different colors of the halo light output may further be used for indicating different segments of the passenger cabin 100 associated with different booking classes. For example, a yellow ("gold") halo light output may indicate first class passenger seats 110, a red halo light output may indicate business class passenger seats 110, and a green halo light output may indicate economy class passenger seats 110. The colors of the halo light output may correspond with color codes printed on the tickets of the respective class.

The color of the light output, emitted by the halo light unit 5, also may be used for indicating that a signal for calling cabin service personnel has been triggered.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft passenger light including:
a reading light unit, comprising at least one reading light source and configured for emitting a targeted reading light output; and
a halo light unit, comprising at least one halo light source and configured for emitting a ring-shaped halo light output, at least partly surrounding the targeted reading light output, wherein the at least one halo light source is configured for selectively emitting light having a color different from white, including at least one of red, green, blue, yellow, purple, and orange light; and
a controller, which is configured for selecting a color of the halo light output depending on a category and/or an occupancy status of a passenger seat, associated with the aircraft passenger light, and for operating the at least one halo light source to emit the selected color.

2. The aircraft passenger light according to claim 1, wherein the reading light unit and the halo light unit have a common light emission plane, through which the targeted reading light output and the ring-shaped halo light output are emitted in operation.

3. The aircraft passenger light according to claim 1, wherein the reading light unit and/or the halo light unit comprise a transparent cover.

4. The aircraft passenger light according to claim 1, wherein the reading light unit comprises a reflector, wherein the reflector in particular is rotationally symmetric with respect to a main light emission axis (A) of the reading light unit, wherein the reflector more particularly is a parabolic reflector.

5. The aircraft passenger light according to claim 4, wherein the reflector surrounds the at least one reading light source and wherein the at least one halo light source is arranged outside the reflector.

6. The aircraft passenger light according to claim 4, wherein an inner surface as well as an outer surface of the reflector are reflective, respectively.

7. The aircraft passenger light according to claim 4, comprising at least one outer wall arranged outside the reflector, thereby forming a halo light chamber between the outer surface of the reflector and the outer wall, wherein the at least one halo light source is arranged within said halo light chamber.

8. The aircraft passenger light according to claim 7, wherein an inner side of the outer wall, facing the halo light chamber, is reflective or diffusely reflective.

9. The aircraft passenger light according to claim 1, wherein the at least one reading light source and the at least one halo light source are arranged on a common circuit board, in particular on a common printed circuit board.

10. The aircraft passenger light according to claim 1,
wherein the at least one reading light source comprises at least one LED, and
wherein the at least one halo light source comprises at least one LED.

11. The aircraft passenger light according to claim 1, wherein the halo light unit comprises a plurality of independently controllable halo light sources of different colors, in particular at least three independently controllable halo light sources of different colors, such as independently controllable red, green, and blue halo light sources.

12. An aircraft comprising:
at least one aircraft passenger light according to claim 1.

13. The aircraft passenger light according to claim 1,
wherein the at least one reading light source is configured for emitting white light, and/or
wherein the at least one halo light source is configured for selectively emitting white light and light having a color different from white.

14. A method of operating an aircraft passenger light including:
a reading light unit, comprising at least one reading light source and configured for emitting a targeted reading light output; and
a halo light unit, comprising at least one halo light source and configured for emitting a ring-shaped halo light output, at least partly surrounding the targeted reading light output,
wherein the method comprises:
operating the at least one halo light source independently from the at least one reading light source; and
selecting a color of the halo light output depending on a category and/or an occupancy status of a passenger seat associated with the aircraft passenger light, and operating the at least one halo light source to emit the selected color.

15. The method according to claim 14, comprising:
operating the at least one halo light source in a flashing mode and/or activating the at least one halo light source simultaneously with or in advance of an acoustic announcement.

16. An aircraft passenger light including:
a reading light unit, comprising at least one reading light source and configured for emitting a targeted reading light output;
a halo light unit, comprising at least one halo light source and configured for emitting a ring-shaped halo light output, at least partly surrounding the targeted reading light output;
a reflector surrounding the at least one reading light source, wherein the at least one halo light source is arranged outside the reflector; and
at least one outer wall arranged outside the reflector, thereby forming a halo light chamber between the outer surface of the reflector and the outer wall, wherein the at least one halo light source is arranged within said halo light chamber;
wherein the outer surface of the reflector and an inner side of the outer wall are covered with a reflective coating or with a diffusely reflective coating, respectively.

17. The aircraft passenger light according to claim 16, wherein the reading light unit and the halo light unit have a common light emission plane, through which the targeted reading light output and the ring-shaped halo light output are emitted in operation.

18. The aircraft passenger light according to claim 16, wherein the reading light unit and/or the halo light unit comprise a transparent cover.

19. The aircraft passenger light according to claim 16, wherein the reflector is rotationally symmetric with respect to a main light emission axis (A) of the reading light unit, wherein the reflector in particular is a parabolic reflector.

20. The aircraft passenger light according to claim 16, wherein the halo light unit comprises a plurality of independently controllable halo light sources of different colors, in particular at least three independently controllable halo light sources of different colors, such as independently controllable red, green, and blue halo light sources.

\* \* \* \* \*